United States Patent [19]

Grosse

[11] Patent Number: 5,662,249
[45] Date of Patent: Sep. 2, 1997

[54] ALL IN ONE MEASURE/FUNNEL/POUR/MIX/SHAKE CONTAINER

[76] Inventor: Allison Grosse, 79 Woodland Dr., East Islip, N.Y. 11730

[21] Appl. No.: 525,974

[22] Filed: Sep. 7, 1995

[51] Int. Cl.⁶ .................................................. B67C 11/00
[52] U.S. Cl. .................... 222/461; 222/539; 141/319; 141/331; 141/340; 141/381
[58] Field of Search .................................. 222/158, 184, 222/461, 465.1, 538, 543, 567, 539; 73/426–428; 141/18, 100, 21, 22, 319, 328, 331, 340–343, 381

[56] References Cited

U.S. PATENT DOCUMENTS

| | | | |
|---|---|---|---|
| 522,969 | 7/1894 | Connally | 73/427 |
| 589,659 | 9/1897 | Krack | 141/331 |
| 1,225,610 | 5/1917 | Garner | 141/331 |
| 1,419,580 | 6/1922 | Molinari | 141/381 |
| 2,126,584 | 8/1938 | Small | 73/427 |
| 2,649,227 | 8/1953 | Vaughn | 222/539 |
| 2,736,469 | 2/1956 | Stone | 222/539 |
| 4,721,393 | 1/1988 | Kwast | 366/341 |
| 4,802,597 | 2/1989 | Dubach | 215/307 |
| 4,916,672 | 4/1990 | McCrory | 366/130 |
| 5,168,908 | 12/1992 | Boyum | 141/340 |
| 5,295,610 | 3/1994 | Levison | 222/26 |

FOREIGN PATENT DOCUMENTS 24681  11/1906  United Kingdom ................ 222/461

*Primary Examiner*—Philippe Derakshani
*Attorney, Agent, or Firm*—Alfred M. Walker

[57] ABSTRACT

A shaking container designed with built in measuring cup, funnel and pour spout intended to measure, mix and pour a powdered material with a liquid. This container will enable the user to invert the cap to sit in the container opening, using this cap as a measuring cup, as it has measure markers inside the cap. When measure completed, the top spout, inverted into the container, to be unsnapped, thereby funneling the powder down into the container. The container to be filled with liquid, then cap replaced in closed position. With pour spout snapped, shaking can commence.

13 Claims, 2 Drawing Sheets

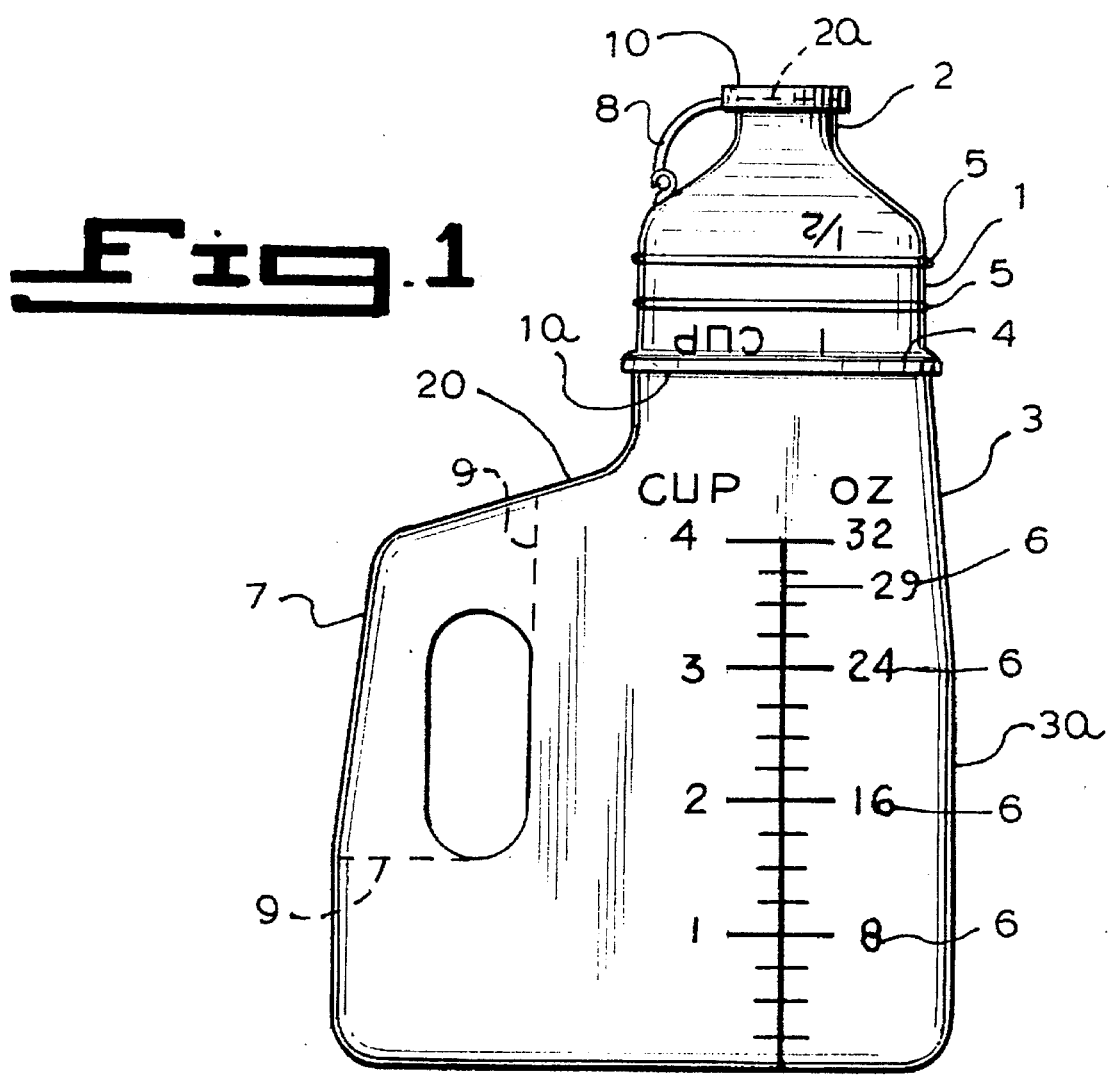

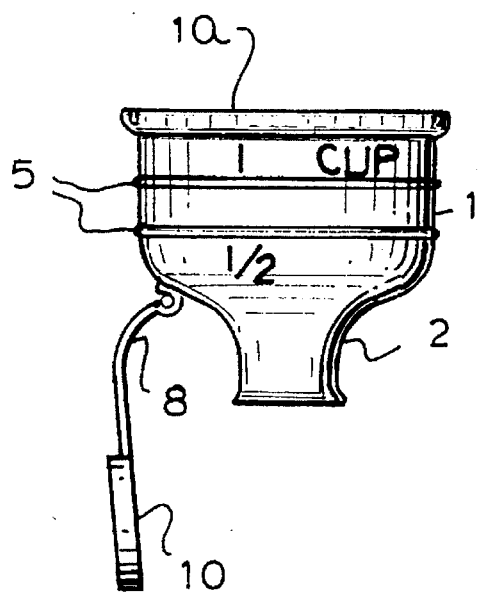
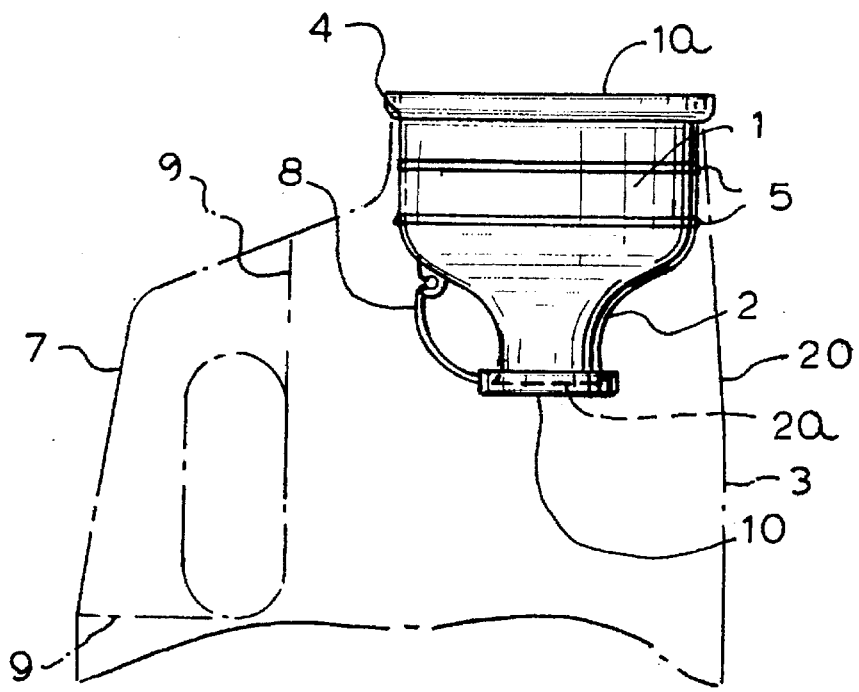

ALL IN ONE MEASURE/FUNNEL/POUR/MIX/SHAKE CONTAINER

FIELD OF THE INVENTION

This invention relates to the measuring, pouring, mixing and storing of liquids and powders, or any combination thereof, in an all-in-one container.

BACKGROUND OF THE INVENTION

There have been other attempts to provide measuring and pouring cups and containers. Among these are U.S. Pat. No. 4,721,393, invented by Kwast, which is a Ratio Mix Container that pertains to ratio mixtures of two liquids whereby openings can be selectively opened and closed. U.S. Pat. No. 5,168,908, invented by Boyum, is a Non-Spill Funnel used for introducing liquids and flowable materials into tanks. U.S. Pat. No. 5,295,610, invented by Levison, is a Mixing Can with Hinged Cap With an Integral Measuring Cup which is used to blend 2 cycle fuel mixture and de-markation of ratio mixed by using an attached hinged cap. U.S. Pat. No. 4,916,672, invented by McCrory, is a Mixing and Blending Shaker Apparatus which mixes and shakes with a wire whip attached to the cover. U.S. Pat. No. 4,802,597, invented by Dubach, is a Plastic Stopper for a Container With a Measuring Cup that Serves as a Cap which is a two-sided plastic stopper having a lower portion that can be secured to the neck of a container and a measuring cup which can be reversed and set on the lower portion to form a seal-this serving as a cap.

OBJECTS & ADVANTAGES

The objects and advantages for this invention is in relation to mixing up infant formula from powder.
a. to eliminate the use of several different kitchen utensils including a measuring cup, funnel, mixer/shaker, and storage container and pourer. This invention will be a combination of all these utensils into one self-contained container.
b. when mixing baby formula it is imperative to have an accurate measurement. When mixing with regular measuring cups, it is inaccurate to guess if a powder is equal on all sides of the cup with a measuring mark only on one side. This invention will have a ring wrapped around the container that will show that the powder is level on all sides of the cup.
c. when using separate measurers and funnels, sometimes powders stick to the objects and are not all included into the mix. This invention will thereby include all these particles into the mixture by using the funnel as part of the cap so that when shaking all particles remaining will be washed right into the mixture.
d. when using ready-to-feed formula, it is kept in the original can in the refrigerator, and used as needed. This container will serve as an ease in storing and dispensing the powder-made formula.
e. the cost reduction in making formula by powder as opposed to purchasing ready-to-feed will be greatly seen, if there were an invention provided to make this process easier.
f. to have an air-tight pour spout for storage in the refrigerator. One wouldn't need a separate cover.
g. to have a leak-proof container by which shaking will not be a messy event.
h. to use this invention for other mixtures as well (e.g. iced tea, kool aid)
i. reduce the time it takes to make the formula with a screaming baby in one's ear.
j. the powdered formula should be refrigerated

SUMMARY OF THE INVENTION

The present invention addresses the need to prepare a quart of infant formula from powder. Due to the fine consistency of this specific powder, it is imperative to use the least amount of utensils for measuring. The present invention has a wide-mouthed quart container with predetermined measuring lines (preferably with a handle). The cap is a measuring cup and funnel combination.

The cap has a non-spill seal and a smaller cap for the funnel end. This measuring cup has rings to identify the increments. Hence, when measuring powders, sometimes what hits the mark on one side of the cup doesn't always on the other side. These ridge type rings will also aid in the nestling of the cap when turned upside down and being used as the funnel. The container itself can have a slide rule measuring system, whereby notches are placed vertically down the container at certain increments. This adaptation of the invention can has an arrow type indicator with an attached ring encircling the container which will slip into the grooves or notches.

The present invention has two separate sets of measuring increments. One in the top and one in the container. This will serve the purpose for measuring any combination of powders and liquids separately, to be mixed together.

DESCRIPTION OF THE DRAWINGS

The present invention will be more fully understood and described in connection with the drawings in which:

FIG. 1 is a perspective view of the measuring funnel attached as a top for storage of this container.

FIG. 2 is a top view of the relationship between the measuring funnel and the container in a storage position.

FIG. 3 is an internal view of how the measuring cap inverts to become a funnel.

FIG. 4 is a front view of the measuring funnel itself.

DESCRIPTION OF THE PREFERRED EMBODIMENTS

Referring now more specifically to the drawings, the unitary combination measuring and mixing container 20 provides a self-contained dual compartment nesting container for measuring and mixing flowable liquid-powder mixtures, such as infant formulas.

Container 20 contains a first measuring and mixing compartment cap 1 including a funnel outlet portion 2, which first measuring and mixing compartment cap 1 is removably joinable and adjacent to a second measuring and mixing container compartment 3 having a mouth end 4 in a nesting and removably sealing relationship with an input end 1a of first measuring and mixing compartment cap 1.

When joined together, cap compartment 1 and container compartment 3 are in fluid flow communication with each other.

First measuring and mixing compartment cap 1 includes wide input mouth end 1a and smaller output spout end 2a, as well as a plurality of measuring rings 5 encircling cap compartment 1, to provide visible indicia for a liquid or powder component to be observed thereat.

Second measuring and mixing container compartment 3 includes a plurality of further measuring indicia elements 6 for liquid or powder component to be observed thereat.

To use mixing container 20 of the present invention one first removes measuring cap compartment 1. The user fills container compartment 3, up to desired measurement indicia 6, with liquid. Compartment cap 1 is then turned upside down, while making sure that funnel end seal 10 is closed, and funnel end spout 2 is placed into the container resting on compartment mouth 4. The user pours in a predetermined amount of powder desired into funnel 2 using measurements 5 located inside cap 1, and makes sure the powder is up to the desired fill ring 5 on all sides of cap 1.

Cap 1 is lifted up and seal 10 of pour spout 2 is unsnapped, thereby letting the powder run into container compartment 3. Cap compartment 1 is then lifted up and seal 10 of output spout end 2 is resnapped in a closed position. When finished with all ingredients, cap compartment 1 and seal 10 are inverted and replaced in an inverse position upon container compartment 3, as seen in FIG. 1.

The present invention preferably includes handle 7 attached to container compartment 3, which handle 7 is used for shaking. Handle 7 preferably is a separate entity, and is separated by insulated wall 9 from the inside of container compartment 3, so all mixtures are confined to dual container 20.

Therefore cleaning is easier and wall 9 isolates handle 7 from the fluid in container compartment 3, so that heated liquid will not uncomfortably overheat handle 7.

With respect to baby formula mixture, warm to hot water is preferably used, and therefore handle 7 is separate, and not warm itself, as handle 7 would be hot if handle 7 were hollow and had the mixture running through it as well.

Using handle 7, which is blocked from liquid by insulated wall 9, one shakes all the ingredients to thoroughly mix the mixture of the powder and liquid. Any powder that has remained, for any reason, in the funnel cap compartment 1 is flushed in with the rest of the mixture.

When using the present invention for infant powdered formula, hot water is recommended. Therefore insulated wall 9 blocks handle 7, to isolate the user's hand away from hot container compartment 3. When thoroughly mixed, the mixture is put right in a refrigerator for storing and pouring when needed.

The present invention may be constructed of light transmitting material, preferably transparent, or at least a translucent material, and container compartment 3 includes measuring indicia marks 6 upon wall 3a of the container compartment 3.

Cap compartment 1 of the present invention is preferably also constructed with the same light transmitting material as container compartment 3. Top input mouth 1a of cap compartment 1 is preferably constructed to form a tight, leakproof seal with mouth 4 of container compartment 3, either by a snap-on method or a screw-on method. Cap compartment 1 is also of preferably a truncated bubble shape, slimming down to become shaped as a funnel at output spout end 2.

The entire volume of cap compartment 1 may function as a measuring device. Smaller spout end 2 of the funnel portion 2a has snap-on seal 10 with holding strap 8, whereby lid 10 completely seals container compartment 3.

Cap compartment 1 preferably also has marking ribs 5 along the inside of cap compartment 1, defining measuring increments as well. Measuring ribs 5 also serves to prevent sliding of cap compartment 1 off of container compartment 3 when cap compartment 1 is being used as a funnel, for pouring liquid and/or powder therethrough, since ribs 5 engage wall 3a of container compartment 3.

Other modifications may be made to the present invention, without department from the scope of the present invention, as noted in the appended claims.

What is claimed that is new is as follows:

1. A combination measuring and mixing container for flowable liquid-powder mixes, comprising:
    a) a first container formed of adjoining sides, top and bottom with an opening in the top, with a raised lip about the opening, forming a mouth of the first container;
    b) a second cap compartment having funnel shaped sides with an input mouth end being wider than a narrower outlet mouth end, the second cap compartment having the input mouth end sized to be closely received about the mouth of the first container, the second cap compartment further having a removable cap for releasably sealing the input mouth end of the second cap compartment; the second cap compartment being removable from the first container for receipt of one of the flowable liquid and powder mixes, and the first container receives the other of the flowable liquid and power mixes, wherein
    the input mouth end of the second cap compartment is closely received about the mouth of the first container and the removable cap is positioned to releasably seal the input mouth end of the second cap compartment so that the combined flowable liquid-powder is mixed by shaking and vigorous agitation of the combined first container and the second cap compartment, and removal of the cap from the second cap compartment enables the liquid-powder mixture to be dispensed through the input mouth end of the second cap compartment, with the second cap compartment serving as a pour spout, and wherein the second cap compartment is removed from the mouth of the first container and inverted for insertion of the input mouth end of the second cap compartment into the mouth of the first container, the funnel shape of the second cap compartment forming a seal within the mouth of the first container to provide a low profile sealable container for ease of storage of the combined flowable liquid-powder mixtures and wherein said first container and said second cap compartment are joinable to form a tight, leak-proof seal and wherein said first container and said second cap compartment are separable to form two separate and distinct measuring devices which will be used to correctly measure mixtures into a self contained mixing, agitating, shaking and storage unit.

2. The combination measuring and mixing container of claim 1, wherein the first container includes a handle portion for ease of agitating and mixing the flowable liquid-powder mixture within the combined measuring and mixing container.

3. The combination measuring and mixing of claim of claim 2, wherein the handle is isolated from the liquid in the first container so that the handle does not become heated when a heated liquid is inserted into the first container.

4. The combination measuring and mixing container of claim 1, wherein a plurality of measuring rings on the second cap compartment provide visible indicia for a liquid or powder component to be observed thereat prior to mixing.

5. The combination measuring and mixing container of claim 1, wherein a plurality of visible indicia on the first container provide visible indicia for a liquid or powder component to be observed thereat prior to mixing, and timber to provide an indication of the volume of the combined flowable liquid-powder mixture in the first container after mixing, and after partial dispensing of the flowable liquid-powder mixture from the first container.

6. The combination measuring and mixing container claim 1, wherein the removable cap is releasably secured to the funnel shaped side of the second cap compartment with a suitable holding strap.

7. The container compartment as in claim 1 wherein said container compartment is constructed of a light transmitting material.

8. The cap compartment as in claim 1, wherein said cap compartment is constructed of a light transmitting material.

9. A combination measuring, pouting, mixing, agitating and storing unit for liquid and powders, or any combination thereof, comprising:

a removable measuring cap compartment of light transmitting material having an input mouth end and an output mouth end forming a funnel shape with the input mouth end wider than the output mouth end, and a container compartment of light transmitting material having an opening forming a mouth thereon, said input end of the cap compartment sealable with the mouth of the container compartment, the cap compartment and container compartment each having a plurality of desired indicia positioned to provide measurements thereon, said cap compartment having a removable and closable cap at the outlet mouth end and a seal thereat, said cap compartment with closable cap positioned on the outlet mouth of the cap compartment being turnable upside down, and whereby a predetermined mount of powder is poured into the input end of said cap compartment up to a set of predetermined measurements located upon said cap compartment, and wherein the input end of the cap compartment with the powder therein is placed upon the mouth of the container compartment and inverted to place the cap compartment above the container compartment, the cap is then removed from the cap compartment, and a predetermined mount of liquid is poured through the cap compartment into the container compartment, the closable cap is inserted on the output end of the cap compartment and the mixture of flowable liquid-powder mixture is vigorously shaken to mix the contents thoroughly together, and wherein said cap compartment may be removed, inverted, and the outlet mouth end of the cap compartment inserted within the mouth of said container compartment, with the funnel shaped sides of the cap compartment forming a seal within the mouth of the container compartment for storage of said unused portion of the flowable liquid-powder mixture in a compact, refrigerated state.

10. The combination measuring and mixing container of claim 9, wherein the first container includes a handle portion for ease of agitating and mixing the flowable liquid-powder mixture with the combined measuring and mixing container.

11. The combination measuring and mixing container of claim 9, wherein the handle is isolated from the liquid in the first container so that the handle does not become heated when a heated liquid is added to the first container.

12. The combination measuring and mixing container of claim 9 wherein the removable cap is releasably secured to the funnel shaped side of the second cap compartment with a suitable holding strap.

13. The cap compartment as in claim 9, wherein said cap compartment is shaped and used as a funnel to let liquids or powders flow through into said container compartment, and when the removable cap is used to seal the funnel shaped side of the cap compartment, the container compartment and cap compartment may be vigorously shaken to mix any and all remaining powders left in said cap compartment, and when said cap is removed from the funnel side of the cap compartment, the compartment serves as a pour spout when dispensing the mixture from the container compartment.

* * * * *